United States Patent
Kang

(10) Patent No.: US 9,544,953 B2
(45) Date of Patent: Jan. 10, 2017

(54) LIGHT SOURCE DRIVING APPARATUS HAVING A SNUBBER TO PREVENT VOLTAGE AND CURRENT SPIKES, DISPLAY APPARATUS AND DRIVING METHOD THEREOF

(71) Applicant: Samsung Electronics Co., Ltd., Suwon-si (KR)

(72) Inventor: Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/261,541

(22) Filed: Apr. 25, 2014

(65) Prior Publication Data

US 2015/0061530 A1     Mar. 5, 2015

(30) Foreign Application Priority Data

Sep. 3, 2013    (KR) ........................ 10-2013-0105367

(51) Int. Cl.
     *H02M 1/34*        (2007.01)
     *H05B 33/08*       (2006.01)
     *H02H 3/20*        (2006.01)

(52) U.S. Cl.
     CPC ............ *H05B 33/0815* (2013.01); *H02H 3/20* (2013.01); *H02M 1/34* (2013.01)

(58) Field of Classification Search
     CPC ............. H02M 2001/0048; H02M 2001/0041; H02M 2001/346; H02M 1/34; G09G 3/3406; G09G 3/3696; H05B 33/0827; H05B 33/0815

USPC ........... 363/21.01, 62, 16; 345/690; 323/222
See application file for complete search history.

(56) References Cited

U.S. PATENT DOCUMENTS

| | | |
|---|---|---|
| 4,772,810 A | 9/1988 | Felps |
| 6,115,271 A | 9/2000 | Mo |
| 6,477,064 B1 | 11/2002 | Weng et al. |

(Continued)

OTHER PUBLICATIONS

Rong-Jong Wai High Step-Up Converter With Coupled-Inductor IEEE Transactions on Power Electronics, vol. 20, No. 5, Sep. 2005.*

(Continued)

*Primary Examiner* — Alexander H Taningco
*Assistant Examiner* — Renan Luque
(74) *Attorney, Agent, or Firm* — Sughrue Mion, PLLC

(57) ABSTRACT

A light source driving apparatus, a display apparatus and a driving method thereof are disclosed. The light source driving apparatus includes a tapped-inductor boost converter (TIBC) circuit, the TIBC circuit including: a switching unit configured to be turned on and off in accordance with a preset cycle; a tapped inductor configured to transfer a current from a primary side to a secondary side as the switching unit is turned on; and a snubber configured to include a clamp capacitor and clamp diode configured to clamp a voltage of the switching unit, a resonance capacitor configured to perform a resonance as being charged and discharged corresponding to a switching cycle of the switching unit, and first and second resonance diodes configured to charge and discharge the resonance capacitor. Thus, the TIBC circuit provided with the lossless snubber can prevent the voltage stress from increasing during the resonance since the voltage of the switching unit is clamped.

25 Claims, 16 Drawing Sheets

(56) References Cited

U.S. PATENT DOCUMENTS

| | | | |
|---|---|---|---|
| 6,865,096 B1* | 3/2005 | Geissler | B23K 9/1056 363/53 |
| 7,233,507 B2 | 6/2007 | Schenk | |
| 8,107,268 B2 | 1/2012 | Chung et al. | |
| 2006/0226816 A1* | 10/2006 | Wai | H02M 1/34 323/222 |
| 2010/0277117 A1* | 11/2010 | Duan | H02M 3/1582 320/103 |
| 2010/0295876 A1* | 11/2010 | Shin | G09G 3/3406 345/690 |
| 2015/0085534 A1* | 3/2015 | Abramovitz et al. | 363/21.01 |

OTHER PUBLICATIONS

Fairchild Semiconductor Datasheet of FQB9ON08 80V N-Channel MOSFET Jan. 2001.*

* cited by examiner

LIGHT SOURCE DRIVING APPARATUS HAVING A SNUBBER TO PREVENT VOLTAGE AND CURRENT SPIKES, DISPLAY APPARATUS AND DRIVING METHOD THEREOF

CROSS-REFERENCE TO RELATED APPLICATION

This application claims priority from Korean Patent Application No. 10-2013-0105367, filed on Sep. 3, 2013 in the Korean Intellectual Property Office, the disclosure of which is incorporated herein by reference, in its entirety.

BACKGROUND

Technical Field

Apparatuses and methods consistent with the exemplary embodiments relate to a light source driving apparatus, a display apparatus and a driving method thereof. More particularly, the exemplary embodiments relate to a light source driving apparatus, a display apparatus and a driving method thereof, in which a snubber is provided for preventing voltage and current spikes generated in switching of a switching device.

Description of the Related Art

In a display apparatus such as a television (TV), a driver for driving a light emitting diode (LED), or the like, light source may include a driving circuit to which a tapped-induced boost converter (hereinafter, referred to as a 'TIBC') method is applied.

FIG. 1 is a circuit diagram showing a TIBC driving circuit of the related art, and FIG. 2 shows ideal waveforms of the TIBC driving circuit of FIG. 1.

The waveforms shown in FIG. 2 are ideal waveforms in which all parasitical components of the circuit are ignored, without reflecting noise generated in implementing the practical circuit. For example, $N_1$ and $N_2$ of FIG. 1 indicate magnetically coupled inductors serving as a transformer. In FIG. 1, a leakage inductance component $L_{1k}$ inevitably parasitic on the transformer is not shown, and a capacitance component $C_{ds}$ between a drain and a source parasitic on metal oxide field effect transistor (MOSFET) $M_1$ is not shown.

In a boost converter of the related art, voltage stress applied between both ends of the MOSFET is equal to $V_o$. However, in the TIBC, as shown in the waveforms of $V_D$ of FIG. 2, voltage stress applied between both ends of the MOSFET is drastically lowered into $(N_1V_o+N_2V_i)/(N_1+N_2)$, but an advantage of lowering the voltage stress is cancelled out by the leakage inductance $L_{1k}$ and capacitance $C_{ds}$.

FIG. 3 is a circuit diagram showing a TIBC driving circuit including a main parasitical component, and FIG. 4 shows waveforms of the TIBC driving circuit of FIG. 3. The waveforms of FIG. 4 show real waveforms of the TIBC circuit in FIG. 1, which involves waveform ringing due to parasitic components as compared with the ideal waveforms of FIG. 2.

Specifically, as compared with the waveforms of FIG. 2, the waveforms of FIG. 4 show that a very high voltage spike and ringing due to the spike are generated in response to the MOSFET $M_1$ being turned off ($t\_{off}$), and thus the spike and ringing are generated in a current $i_p$ and $i_d$. The spike and the ringing are caused by resonance between the parasitic components $L_{1k}$ and $C_{ds}$. As shown in FIG. 3, a drain of $M_1$ is not clamped anywhere and connected to a tap portion to which primary and secondary winding wires are connected, and therefore VD increases without limit while energy stored in $L_{1k}$ is transferred to $C_{ds}$ by resonance. That is, if a current flowing in $L_{1k}$ just before turning off $M_1$ is $I_p$, the spike of $V_D$ has an amplitude of $I_p*\sqrt{(L_{1k}/C_{ds})}$. Therefore, the voltage spike becomes higher as $I_p$ increases, as $L_{1k}$ increases or as $C_{ds}$ decreases. For example, the spike having a high voltage of about 150-200V is generated when $V_D$ is about 30V.

As a method of preventing the spike and the ringing, the circuit may be changed to achieve voltage clamping, or to additionally include a resistor R, a capacitor C and a diode D that constitute an RCD snubber circuit. FIG. 5 is a circuit diagram showing an example where an RCD snubber 51 is applied to the TIBC circuit of FIG. 3.

However, the RCD snubber shown in FIG. 5, which is a dissipative snubber or a lossy snubber, is difficult to be applied to the TIBC circuit of the driver since it has disadvantages that an efficiency of the circuit is low and a snubber resistor generates a lot of heat.

SUMMARY

The foregoing and/or other aspects may be achieved by providing a light source driving apparatus with a tapped-inductor boost converter (TIBC) circuit, the TIBC circuit including: a switching unit configured to be turned on and off in accordance with a preset cycle; a tapped inductor configured to transfer a current from a primary side to a secondary side as the switching unit is turned on; and a snubber configured to include a clamp capacitor and clamp diode a voltage of a voltage of the switching unit, a resonance capacitor configured to perform a resonance as being charged and discharged which corresponds to a switching cycle of the switching unit, and first and second resonance diodes configured to charge and discharge the resonance capacitor.

The clamp capacitor may be configured to include a large-capacity capacitor to maintain a predetermined voltage within the switching cycle.

The resonance capacitor may be configured to include a small-capacity capacitor to be fully charged and discharged within the switching cycle.

The clamp capacitor and the resonance capacitor may be configured to have larger capacity than the drain-source capacitor of the switching unit.

The voltage of the switching unit may be configured to be clamped by a voltage of the clamp capacitor.

The voltage of the clamp capacitor may be configured to have a level obtained from dividing an output voltage and input voltage of the tapped-inductor boost converter circuit by a turn ratio of the tapped inductor.

The snubber may be configured to operate in a current continuity mode which corresponds to the switching cycle of the switching unit.

The switching unit may be configured to be turned on in a state that the resonance capacitor is discharged.

The tapped-inductor boost converter circuit may be configured to reverse a current in the secondary side of the tapped inductor in response to the switching unit being turned on, and perform a resonance with leakage inductance of the switching unit in order to charge the resonance capacitor.

The tapped-inductor boost converter circuit may be configured to selectively perform an additional resonance mode in accordance with preset voltage conditions.

The tapped-inductor boost converter circuit may be configured to clamp a drain voltage of the switching unit, which is boosted up as the switching unit is turned off, to a voltage of the clamp capacitor, and discharges the resonance capacitor.

Another aspect of one or more exemplary embodiments is to provide a display apparatus including: a display configured to display an image; and a driver configured to drive the display and includes a tapped-inductor boost converter (TIBC) circuit, the TIBC circuit includes a switching unit which is turned on and off in accordance with a preset cycle; a tapped inductor which transfers a current from a primary side to a secondary side as the switching unit is turned on; and a snubber configured to include a clamp capacitor and clamp diode to clamp a voltage of the switching unit, a resonance capacitor configured to perform a resonance as being charged and discharged corresponding to a switching cycle of the switching unit, and first and second resonance diodes for charging and discharging the resonance capacitor.

The clamp capacitor may include a large-capacity capacitor configured to maintain a predetermined voltage within the switching cycle, and the resonance capacitor may be configured to include a small-capacity capacitor to be fully charged and discharged within the switching cycle.

The voltage of the switching unit may be configured to be clamped by a voltage of the clamp capacitor.

The voltage of the clamp capacitor may be configured to have a level obtained from dividing an output voltage and input voltage of the tapped-inductor boost converter circuit by a turn ratio of the tapped inductor.

The switching unit may be configured to be turned on in a state that the resonance capacitor is discharged, and the tapped-inductor boost converter circuit may reverse a current in the secondary side of the tapped inductor in response to the switching unit being turned on, and perform a resonance with leakage inductance of the switching unit in order to charge the resonance capacitor.

The tapped-inductor boost converter circuit may be configured to clamp a drain voltage of the switching unit, which is boosted up to a voltage of the clamp capacitor as the switching unit is turned off, and discharges the resonance capacitor.

Another aspect of one or more exemplary embodiments is to provide a driving method of a light source driving apparatus with a tapped-inductor boost converter circuit including a switching unit turned on and off in accordance with a preset cycle, a tapped inductor transferring a current from a primary side to a secondary side as the switching unit is turned on, and a snubber provided at the secondary side of the tapped inductor and operating in a current continuity mode, the method including: turning on the switching unit in a state that a resonance capacitor of the snubber is discharged; transferring a current from the primary side of the tapped inductor to the switching unit as the switching unit is turned on; reversing a current in the secondary side of the tapped inductor; and performing a resonance between leakage inductance of the switching unit and the resonance capacitor to charge the resonance capacitor.

The method may further include performing an additional resonance by the tapped-inductor boost converter circuit in accordance with preset voltage conditions.

The method may further include turning off the switching unit; and boosting up a drain voltage of the switching unit as the switching unit is turned off.

The method may further include clamping the drain voltage of the switching unit to a voltage of a clamp capacitor; and discharging the resonance capacitor.

The voltage of the clamp capacitor may have a level obtained from dividing an output voltage and input voltage of the tapped-inductor boost converter circuit according to a turn ratio of the tapped inductor.

The clamp capacitor may include a large-capacity capacitor to maintain a predetermined voltage within the switching cycle, and the resonance capacitor includes a small-capacity capacitor to be fully charged and discharged within the switching cycle.

An aspect of an exemplary embodiment may provide a TIBC circuit comprising: a switching unit configured to be turned on and off in accordance with a preset cycle; a tapped inductor configured to transfer a current from a primary side to a secondary side as the switching unit is turned on; and a snubber configured to clamp a voltage of the switching unit, a resonance capacitor configured to perform a resonance corresponding to a switching cycle of the switching unit, and first and second resonance diodes configured to charge and discharge the resonance capacitor.

The snubber may include a clamp capacitor and clamp diode.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments of an image reproducing apparatus, a server and image reproducing methods thereof will be described in detail with reference to the accompanying drawings.

Figure 6:
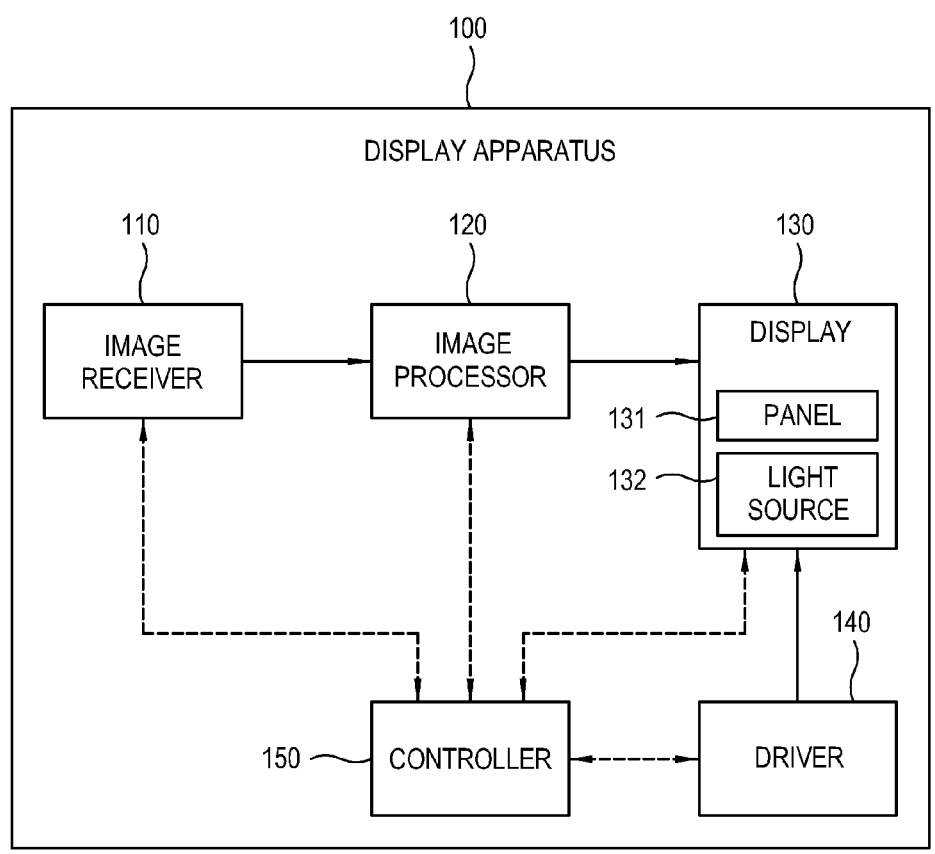
FIG. 6 is a block diagram of a display apparatus according to an exemplary embodiment.

FIG. 6 is a block diagram of a display apparatus 100 according to an exemplary embodiment.

As shown in FIG. 6, the display apparatus 100 processes an image signal received from an external image source (not shown) through a preset imaging process, and displays the processed image signal as an image.

In this exemplary embodiment, a TV that processes a broadcast image based on a broadcast signal/broadcast information/broadcast data will be described as the display apparatus, but is not limited thereto. Alternatively, the display apparatus 100 may for example include a monitor, or the like, besides the TV as long as it can process an image.

Also, the kind of image to be displayable on the display apparatus 100 is not limited to the broadcast image. For instance, the display apparatus 100 may display a moving image, a still image, an application, on-screen display (OSD), a graphic user interface, or like images for various operation controls, based on signals/data received from various image sources (not shown).

In this exemplary embodiment, the display apparatus 100 may be achieved by a smart TV. The smart TV may receive and display a broadcast signal in real time, have a web-browser function that enables various-contents search and consumption through Internet while displaying the broadcast signal in real time, and provide a convenient user environment. Also, the smart TV includes an open software platform and thus provides a user with interactive service. Thus, the smart TV may provide a user with various contents, e.g., an application for predetermined service through an open software platform. For example, such an application can provide various kinds of service may include social network service (SNS), financial service, news, weather, a map, music, a movie, a game, an electronic book, etc.

As shown in FIG. 6, the display apparatus 100 includes an image receiver 110 to receive an image signal, an image processor 120 to process the image signal received in the image receiver 110, a display 130 to display the image signal processed by the image processor 120 as an image, a driver 140 to drive the display 130, and a controller 150 to control operations of general elements of the display apparatus 100.

The image receiver 110 receives an image signal and transmits the received image signal to the image processor 120. The image receiver 110 may be achieved in various forms in accordance with formats of the received image signal and types of the display apparatus 100. For example, the image receiver 110 may wirelessly receive a radio frequency (RF) signal from a broadcast station (not shown), or may receive an image signal based on composite video, component video, super video, SCART, high definition multimedia interface (HDMI), etc., through a wire. The image receiver 110 includes a tuner to be tuned to a channel for receiving a broadcast signal in response to the image signal being the broadcast signal.

The image signal may be received from an external device such as a personal computer (PC), an audio/video (AV) device, a smart phone, a smart pad, etc. The image signal may be based on data received through the Internet or like network. In this case, the display apparatus 100 may further include a communicator (not shown) to perform communication through the network. Also, the image signal may be based on data stored in a flash memory, a hard disk drive, or the like, nonvolatile storage (not shown). The storage (not shown) may be provided inside or outside the display apparatus 100. In the case that the storage is provided outside the display apparatus 100, there is additionally provided a connector (not shown) to which the storage is connected.

The image processor 120 performs various imaging processes previously set up with regard to the image signal. The image processor 120 outputs the processed image signal to the display 130, so that the display 130 can display an image.

The kind of imaging processes performed in the image processor 120 is not limited. For example, the imaging processes may include decoding which corresponds to a variety of image formats, de-interlacing, frame refresh rate conversion, scaling, noise reduction for improving quality of an image, detail enhancement, line scanning, etc.

The image processor 120 may be achieved by an individual group for independently implementing each process, or a system-on-chip where various functions are integrated. For example, the image processor 120 may be achieved by an image board where various chipsets (not shown) for performing such processes, a memory (not shown), electronic parts (not shown), wiring (not shown), or like circuit elements are mounted on a printed circuit board (not shown). In the display apparatus 100 according to an exemplary embodiment, the image receiver 110, the image processor 120 and the controller 150 may be provided in a single image board. Of course, this is merely an example. Alternatively, the image receiver 110, the image processor 120 and the controller 150 may be respectively provided in a plurality of printed circuit boards connected to perform communication with each other. Further, the image board may be accommodated in a casing.

The display 130 displays an image based on the image signal processed by the image processor 120. There is no limit to the type of the display 130. As a flat panel display (FPD), the display 130 may be for example achieved by liquid crystal, plasma, a light emitting diode (LED), an organic light-emitting diode (OLED), a surface-conduction electron-emitter, a carbon nano-tube, nano-crystal, or like various display types.

The display 130 may include an additional element in accordance with the type of display. Specifically, the display 130 may include a panel 131 for displaying an image.I response to the display 130 being achieved by the liquid crystal or the LED, a light source 132 (hereinafter, referred to as a 'backlight unit') may be further provided to emit light to the panel 131. The light source 132 may be classified into an edge type where it is arranged in at least one edge of the panel 131 of the display 130, and a direct type where it is arranged behind the panel 131.

The driver 140 drives the panel 131 of the display 130. As an example of a light source driving apparatus according to an exemplary embodiment, the driver 140 may be achieved in the form of an independent printed circuit board (PCB) provided with at least one circuit device. Alternatively, the driver 140 may be included in the display 130. For example, the light source 132 and the driver 140 may be provided as a single device. The driver 140 controls a current supplied to the light source 132 so that desired quantity of light can be emitted from the light source 132 of the display 130, e.g., from the LED or like backlight.

According to an exemplary embodiment, it will be described that the display 130 is achieved by the LED type, and the driver 140 is an LED driver, but is not limited thereto. For example, this exemplary embodiment may be applied to a case of the light source 132 with an LCD backlight or the panel 131 with an OLED cell. If the panel 131 is achieved by the OLED type, the driver 140 may control the current supplied to each light emission cell so that desired quantity of light can be emitted from the light emission cell in the panel 131.

The controller 150 performs control of various elements of the display apparatus 100. For example, the controller 150 proceeds with the imaging process of the image processor 120 and performs a control operation which corresponds to a command from a remote controller, thereby controlling general operations of the display apparatus 100. For example, the controller 150 may be achieved in the form of a combination between a central processing unit (CPU) and firmware/software. According to an exemplary embodiment, the controller 150 of the display apparatus 100 controls the driver 140 to drive the display 130 in accordance with the image signal processed by the image processor 120.

Figure 7:
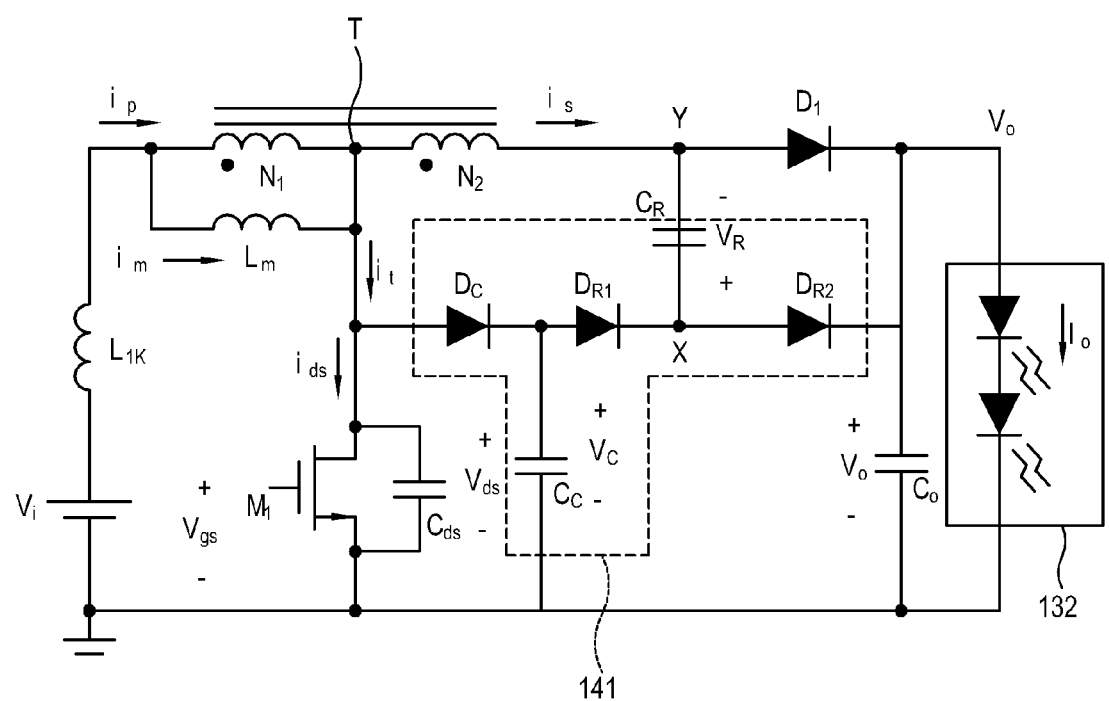
FIG. 7 is a circuit diagram showing a TIBC circuit provided in a driver of the display apparatus according to an exemplary embodiment.

FIG. 7 is a circuit diagram showing a TIBC circuit provided in the driver 140 of the display apparatus 100 according to an exemplary embodiment and including a lossless snubber 141 (hereinafter, referred to as a 'snubber' or a 'snubber section').

As shown in FIG. 7, the TIBC circuit according to an exemplary embodiment includes a switching unit $M_1$ turned on and off in accordance with a preset cycle, tapped inductors $N_1$ and $N_2$ magnetically coupled to each other and transferring a current as the switching unit $M_1$ is turned on, and the snubber 141 performing resonance in a switching cycle of the switching unit $M_1$. The snubber 141 is provided at the secondary side of the tapped inductors $N_1$ and $N_2$.

The lossless snubber 141 of the tapped-inductor boost converter (TIBC) circuit according to an exemplary embodiment shown in FIG. 7 operates in a current continuity mode (hereinafter, referred to as an 'operation mode') in accordance with the cycle of the switching unit $M_i$, and there is no use of any separate auxiliary inductor.

Figure 8:
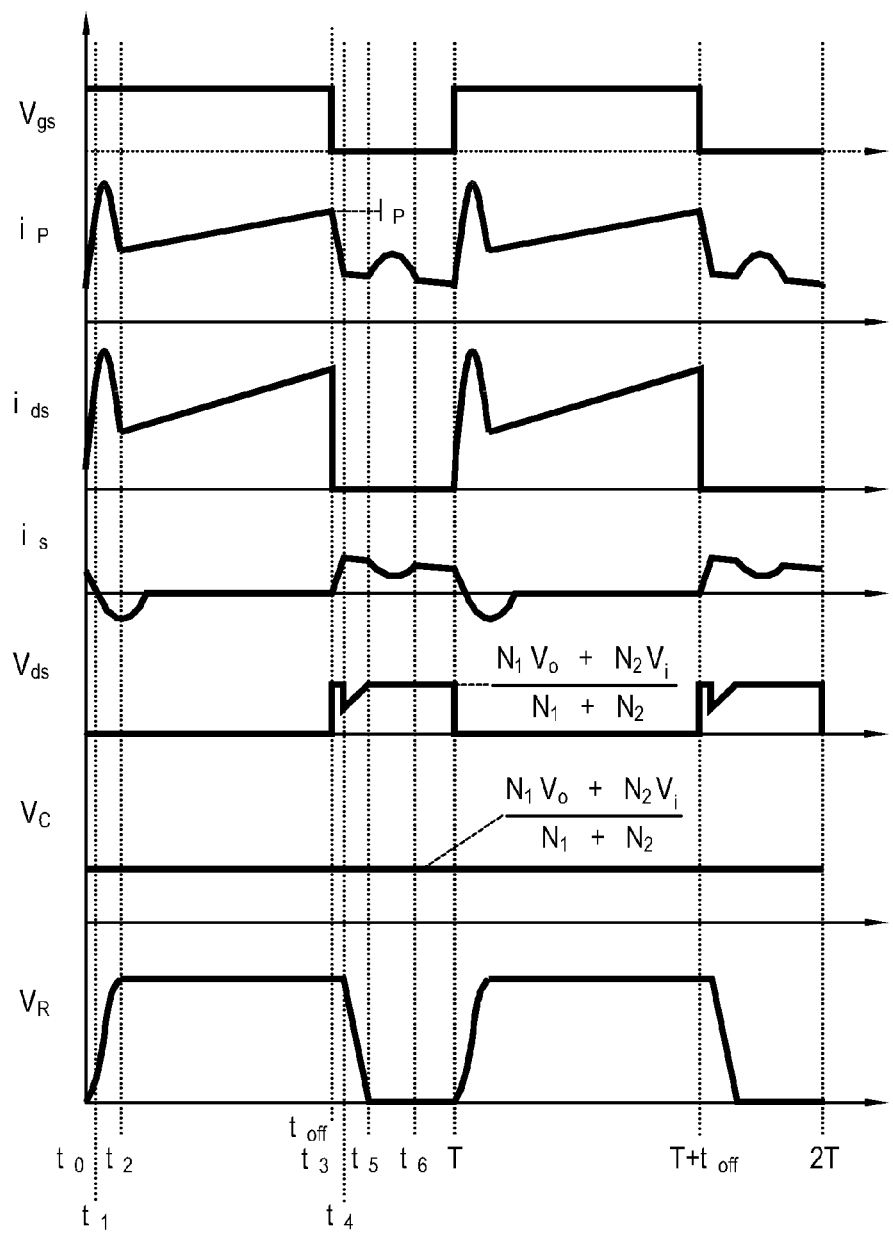
FIGS. 8 and 12 show waveforms which correspond to operation modes of the TIBC circuit.
Figure 10:
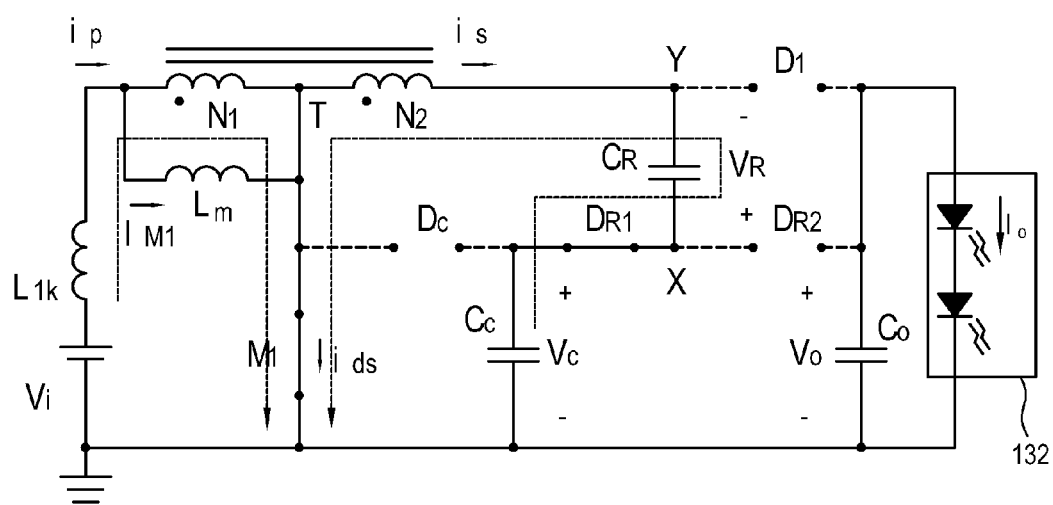
Figure 11:
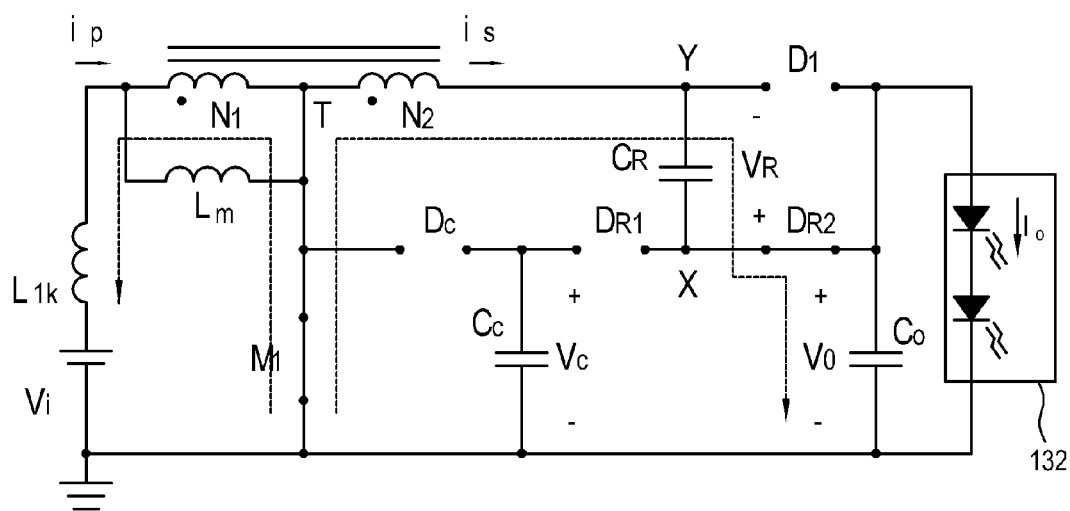
Figure 12:
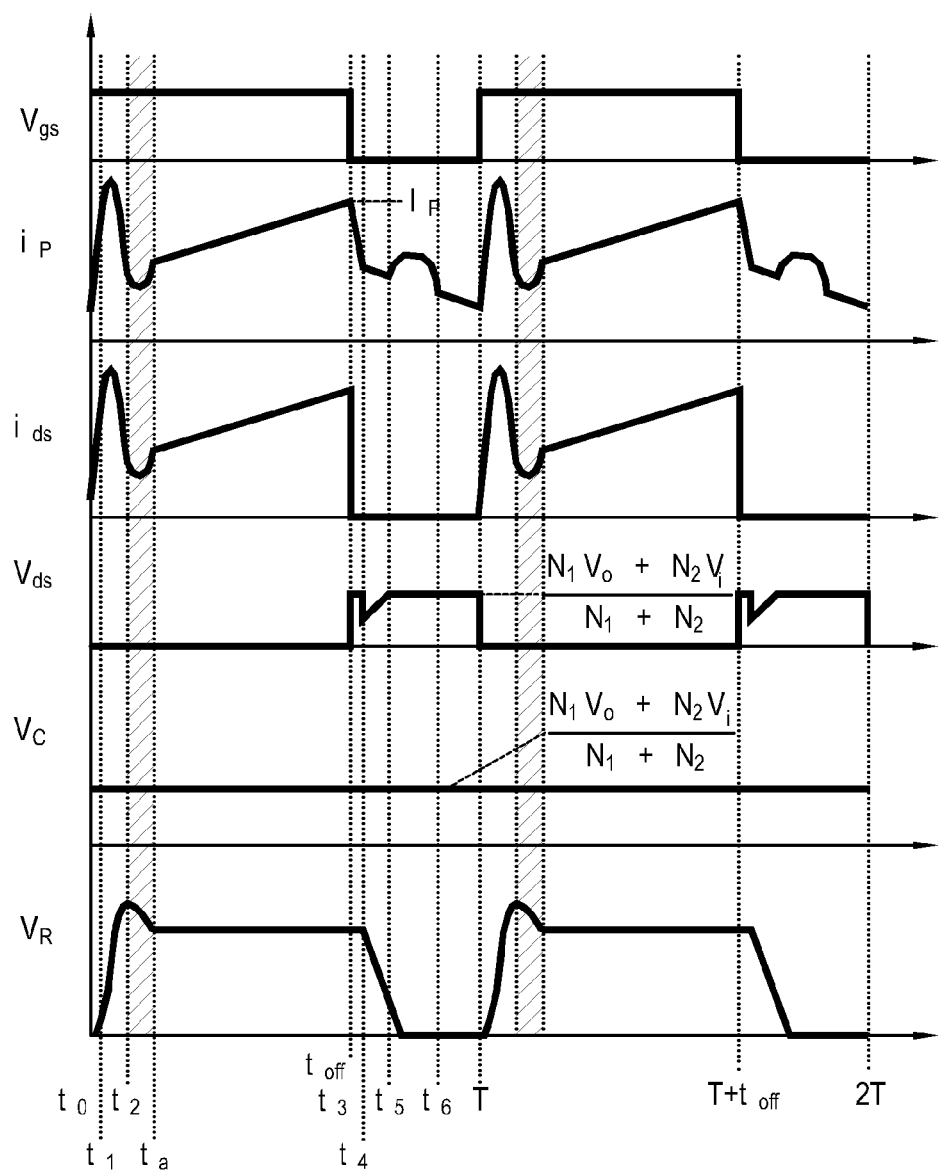
Figure 13:
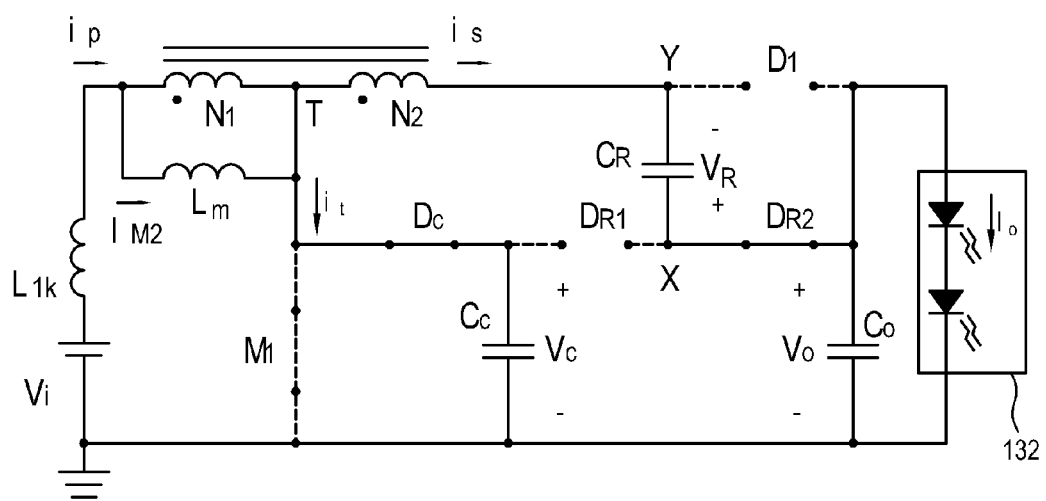

FIGS. 8 and 12 show waveforms which correspond to operation modes of the TIBC circuit, and FIGS. 9 to 11 and FIGS. 13 to 15 are circuit diagrams showing equivalent circuits which correspond to the operation modes of the TIBC circuit of FIG. 7.

In the TIBC circuit according to this exemplary embodiment, the switching unit $M_1$ performs switching to be turned on and off in accordance with the preset cycle T as shown in FIGS. 8 and 12, and resonance is performed in accordance with the switching cycle of $M_1$.

As shown in FIG. 7, the lossless snubber 141 according to this exemplary embodiment includes a clamp capacitor $C_c$ and clamp diode Dc for clamping a voltage of the switching unit $M_i$, i.e., MOSFET; the resonance capacitors $C_R$, and resonance auxiliary diodes $D_{R1}$ and $D_{R2}$ for charging and discharging the resonance capacitors $C_R$. $N_1$ and $N_2$ indicate primary and secondary turn numbers of the tapped inductor; Lm and $L_{1k}$ respectively indicate magnetizing inductance and leakage inductance measured at the primary side; and $C_{ds}$ indicates a drain-source capacitor of $M_i$. The clamp capacitor $C_c$ is connected in parallel to the drain-source capacitor $C_{ds}$ of $M_1$ and clamps a voltage $V_{ds}$ of the $C_{ds}$, thereby preventing $V_{ds}$ from abnormally increasing along with Dc.

The capacity of $C_R$ is set up to be small enough to be completely charged and discharged within the switching cycle, and sufficiently larger than $C_{ds}/((1+N_2/N_1)^2)$ that is obtained by measuring $C_{ds}$ at the secondary side. The capacity of Cc is set up to be sufficiently larger by several dozen of times than that of $C_R$ so that a predetermined voltage can be maintained within the switching cycle. For example, the capacities of the respective capacitors are set up to satisfy $C_c \gg C_R \gg C_{ds}$. Also, Dc, $D_{R1}$ and $D_{R2}$ are diodes having very small capacities in which a conductive section is short.

Figure 1:
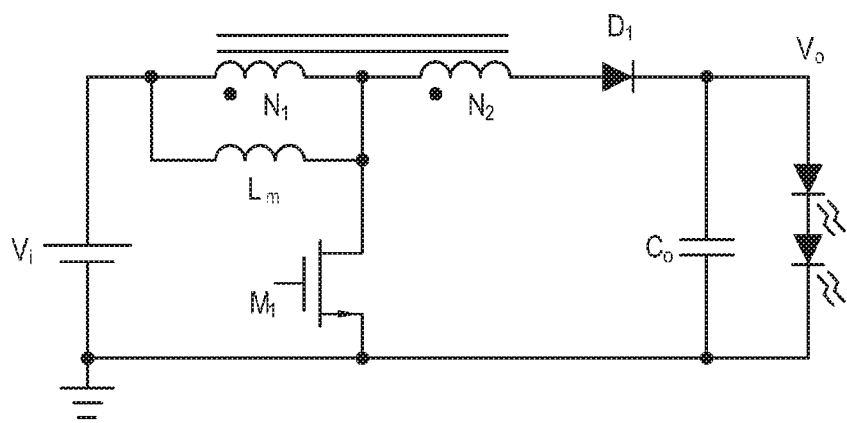
FIG. 1 is a circuit diagram showing a TIBC driving circuit of the related art.
Figure 2:
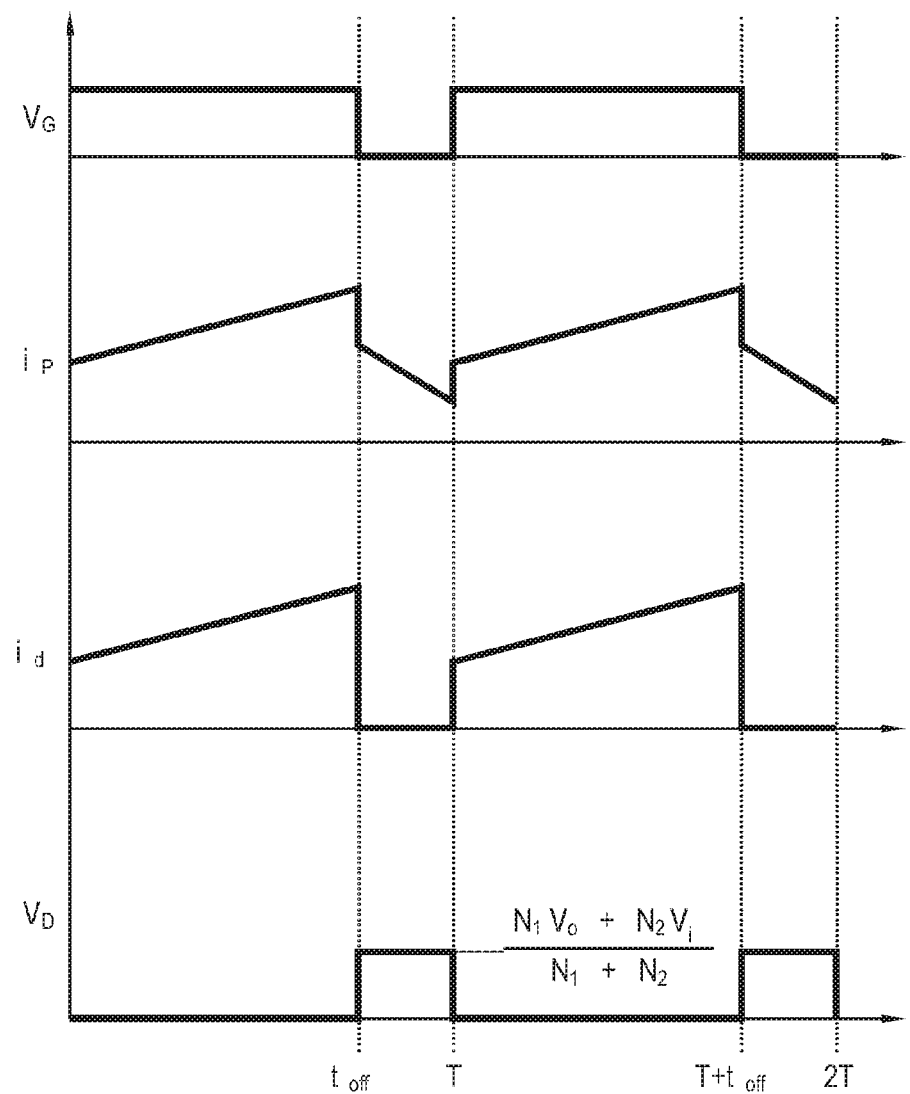
FIG. 2 shows ideal waveforms of the TIBC driving circuit of FIG. 1.
Figure 3:
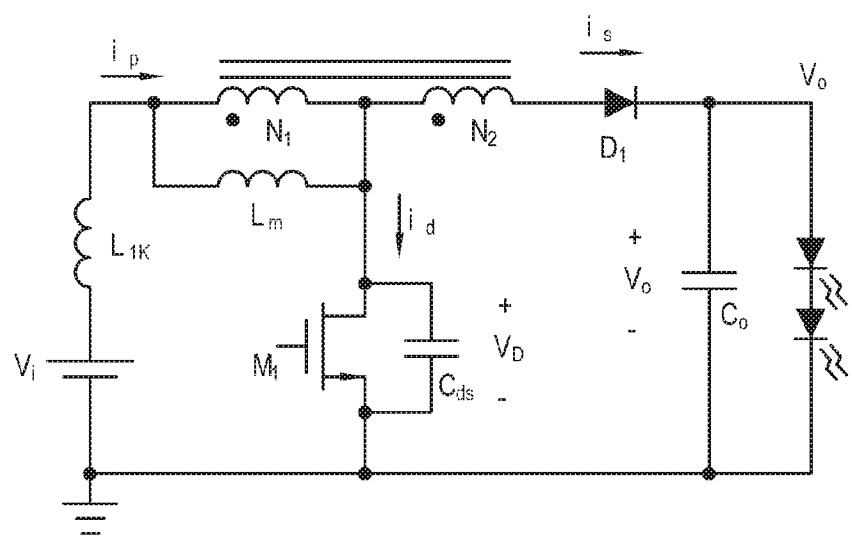
FIG. 3 is a circuit diagram showing a TIBC driving circuit including a main parasitical component.
Figure 4:
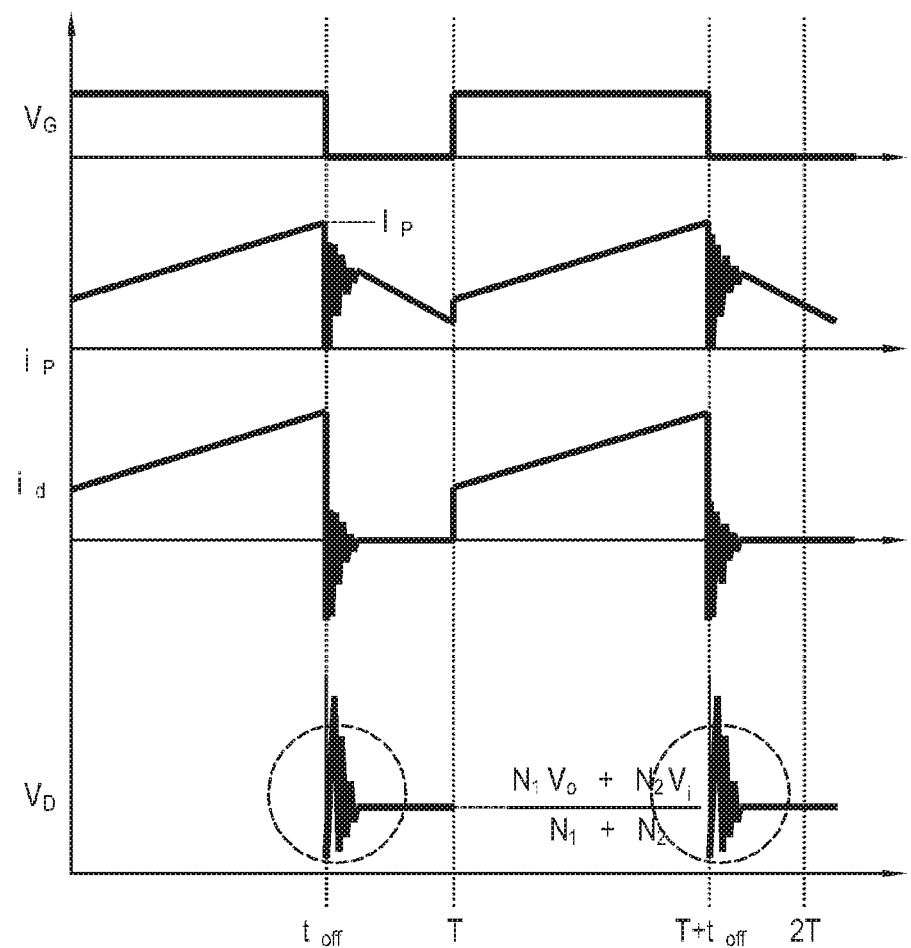
FIG. 4 shows waveforms of the TIBC driving circuit of FIG. 3.
Figure 5:
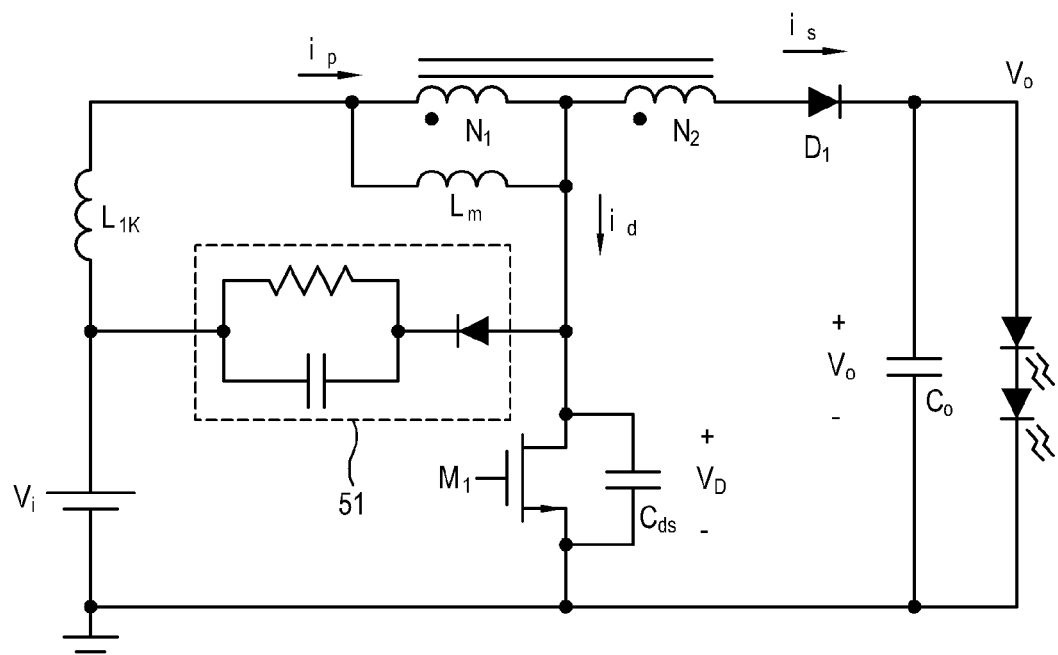
FIG. 5 is a circuit diagram showing an example where an RCD snubber is applied to the TIBC circuit of FIG. 3.

An output/input voltage ratio of the circuit mounted with the snubber 141 may approximate to $(1+D*N_2/N_1)/(1-D)$ which is the same as that of the circuit of FIG. 3 having no snubber. Here, $D=T_{on}/T$, that is, a ratio of ON time during which the switching unit $M_1$ is turned on to the switching cycle T of the switching unit $M_1$ is set up to have a value of 0-1, for example, a value of 0.66, 0.7, etc.

Before MOSFET $M_1$ is turned on, $C_R$ is completely discharged, thereby maintaining VR=0V. A voltage Vc of the clamp capacitor $C_c$ is $(N_1V_o+N_2V_i)/(N_1+N_2)$ as a value obtained from dividing Vo and Vi by a turn ratio of the tapped inductor. A drain voltage $V_{ds}$ of MOSFET $M_1$ is clamped to $C_c$ so that a voltage of $(N_1V_o+N_2V_i)/(N_1+N_2)$ can be also maintained.

Also, Lm is so large that a current flowing in Lm while the snubber 141 is operating can be approximately constantly maintained; and $V_i$, $V_o$ and the driving current $I_O$ supplied to the light source 132 are also constantly maintained without any ripple.

Below, operations of the circuit in the respective operation modes will be described with reference to FIGS. 8 to 15. The operation modes may be implemented in sequence as time goes on ($t_0 \sim t_6$) within one cycle T of the switching unit $M_1$ as shown in FIG. 8.

First ON Mode ($t_0 \sim t_1$)

In the state that a current flowing in $L_m$ is equal to $I_{M1}$ and $C_R$ is completely discharged, the first ON mode starts as the MOSFET $M_1$ is turned on at a time $t_0$ as shown in FIG. 8.

Figure 9:
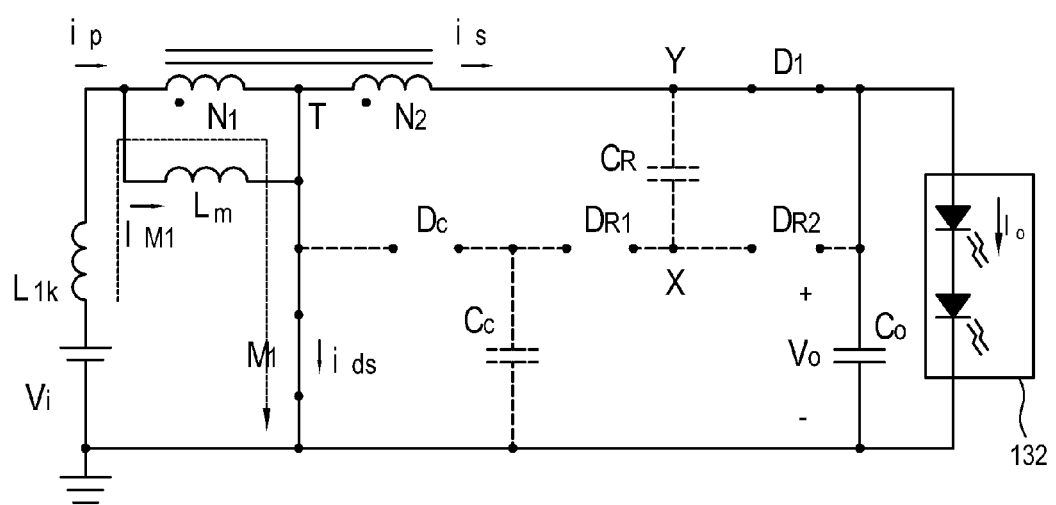
FIGS. 9 to 11 and FIGS. 13 to 15 are circuit diagrams showing equivalent circuits which correspond to the operation modes of the TIBC circuit of FIG. 7.

In the first ON mode, $D_{R1}$, $D_{R2}$ and Dc are all opened as shown in FIG. 9, and the currents $i_p$ and $i_d$ are changed on a limited gradient by $L_{1k}$ as shown in FIG. 8. The first ON mode is terminated as the current $i_p$ at the primary side is all transferred to $M_1$ and thus the current $i_s$ becomes 0.

Second ON Mode ($t_1 \sim t_2$)

$D_{R1}$ is turned on as $i_s$ that becomes 0 at $t=t_i$ by $C_c$ is reversed, and thus the second ON mode starts as the circuit of FIG. 10 is formed. Here, variation in $V_c$ is ignored because of $C_c \gg C_r$.

In response to $M_1$ being turned on, a voltage at a point T in FIG. 7 becomes 0 and a voltage at a point Y tends to drop into a negative voltage. However, variation in voltage is prevented by $C_R$ and variation in current is prevented by $L_{1k}$, thereby forming an equivalent circuit as shown in FIG. 10 and charging $C_R$ by resonance with $L_{1k}$. The resonance current flows into a (+) terminal of Cc or a (+) terminal of CR and is then transferred to the winding wire $N_1$ via the winding wire $N_2$ as shown in FIG. 10, thereby flowing in a clockwise direction at the primary side as shown in FIG. 10.

Third ON Mode ($t_2 \sim t_3$)

As shown in FIG. 8, $C_R$ is completely charged at a time $t_2$ when a half cycle of resonance is passed, and a voltage $V_R$ reaches a peak, thereby making a current $i_s$ flowing in $C_R$ become 0. Here, the snubber 141 in this exemplary embodiment may further perform additional resonance in accordance with predetermined conditions.

Specifically, in response to $C_R$ being fully charged, the current tends to be reversed. However, as $D_{R1}$ is turned off and $D_{R2}$ is turned on, a voltage at a point X is clamped into Vo. After the point X is clamped into $V_o$, it may be determined whether the current of CR Y is reversed in the second ON mode in accordance with voltages at the points.

Here, in response to the voltage at the point Y being higher than $-V_i*N_2/N_1$, the current tents to increase again, thereby turning off $D_{R2}$ and turning on $D_{R1}$ again. The voltage at the point Y is higher than $-Vi*N2/N1$, when 0V is applied to Lm, which refers to the third ON mode. In this case, the current quickly turns on/off $D_{R2}$ and $D_{R1}$ alternately and thus converges on 0. As a result, the voltage at the point Y reaches $-Vi*N_2/N_1$, and the snubber stops operating. FIG. 8 shows the waveforms of when the voltage at the point Y is higher than $-Vi*N2/N_1$, which is caused under the condition of $D>0.5*(1+N_1/N2)$.

Fourth ON Mode ($t_2 \sim t_3$)

Meanwhile, if the voltage at the point Y is lower than $-Vi*N_2/N_1$, the current of CR that becomes 0 in the second ON mode is reversed, thereby forming $N_2$ the equivalent circuit as shown in FIG. 11 and continuing the resonance. This is called the fourth ON mode. At this time, the waveforms are as shown in FIG. 12. Referring to FIG. 11, like the third ON mode, in response to a voltage $V_R$ of $C_R$ reaching a valley, a current of CR becomes 0. Then, the current tends to be reversed, but the voltage at the point X is clamped into $V_c$ as $D_{R1}$ is turned off and $D_{R2}$ is turned on. In response to the voltage at the point Y being lower than $-Vi*N_2/N_1$, no more resonance is performed, as shown in FIG. 12 and the voltage at the point Y is fixed to $-Vi\, N_2/N_1$. The snubber then stops operating.

In response to the voltage at the point Y being higher than $Vi*N_2/N_1$ at a time when the voltage VR of CR reaches a valley, the resonance current is reversed so that the resonance similar to that of the second ON mode can again be generated. In response to the voltage at the point Y being higher than $Vi*N_2/N_1$ at a time when the resonance current becomes 0, the same operation as that of the third ON mode is performed and the snubber stops operating.

Like that of the second ON mode, in response to the voltage at the point Y is lower than $-V_i*N_2/N_1$, the fourth ON mode restarts. Such second to fourth ON modes may be repetitively performed until the resonance current is not reversed and the voltage at the point Y reaches $-V_i*N_2/N_1$, for example, until time $t_a$ of FIG. 12.

In the foregoing exemplary embodiment, at the time t2 when the second ON mode is passed, that is, when $i_s$ becomes 0 and $V_R$ is charged with the maximum voltage, $i_s$ is reversed and $D_{R2}$ is turned on to thereby cause an additional resonance mode for $L_{1k}$ and $C_R$ in response to VR-Vo measured at the primary side being higher than $V_i$. If $V_o>(N_2/N_1)(N_2+3\ N_1/N_2-N_1)*V_i$, such an additional resonance mode may not be caused.

Fifth ON Mode ($t_2$~$t_3$)

In response to the snubber 141 circuit stopping operation, the current at Lm is built up by $V_i$, which is the same as the operation of the existing TIBC with no snubber and thus repetitive descriptions thereof will be avoided.

First OFF Mode ($t_3$~$t_4$)

The first OFF mode starts as $M_1$ is turned off at a time t3. In response to $M_1$ being turned off, $C_{ds}$ is charged with the primary current flowing in Lm and $L_{1k}$, i.e., with the constant current $I_{M2}$ flowing in Lm, thereby boosting up the voltage $V_{ds}$. The voltage $V_{ds}$ increases, and then stops increasing as Dc is turned on, thereby being clamped to $V_c$. Further, the point X is clamped to $V_o$. It then operates like the circuit shown in FIG. 13. The current $i_t$ of the winding tap all flows into $C_c$ because of $C_c \gg C_d$, and each current is changed on a limited gradient by $L_{1k}$. At a time of this mode, in response to the primary current $i_p$ being regarded as $I_p$ shown in FIG. 8, $i_p$ decreases to $I_p/(1+N_2/N_1)$ and thus $i_p=i_s$. Here, $i_p=i_s$ at the moment when the tap current $i_t$ becomes 0, thereby terminating this mode. Further, $C_R$ is linearly discharged by this current.

Second OFF Mode ($t_4$~$t_5$)

Figure 14:
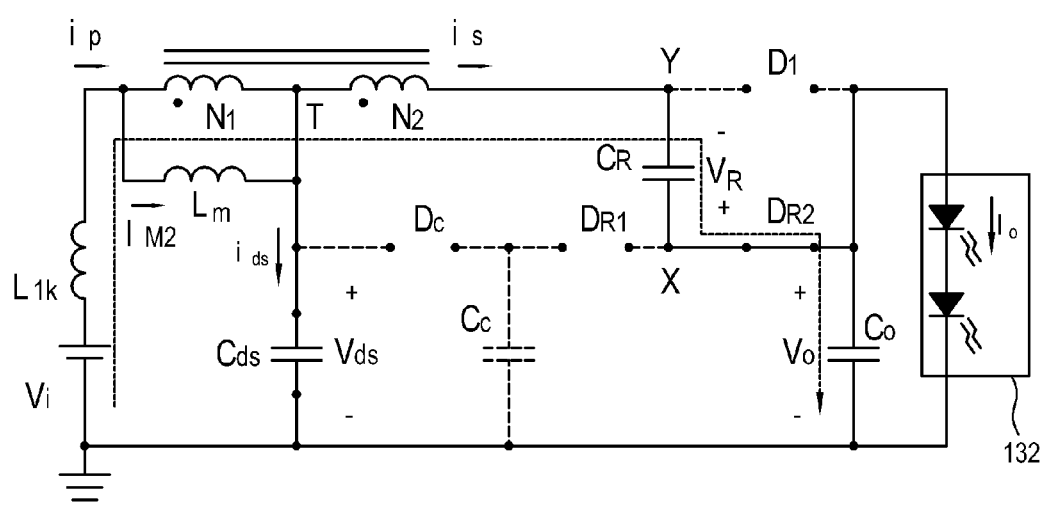

In this mode, a high frequency component due to resonance between $L_{1k}$ and $C_{ds}$ and a low frequency component due to $C_R$ discharged by $I_{M2}$ are superimposed, and high frequency resonance is not freely performed but clamped into $V_c$ and dissipated. At a time $t_5$ of FIG. 8, $C_R$ is completely discharged, and its equivalent circuit is formed as shown in FIG. 14. When $C_R$ is completely discharged, the snubber is reset and terminated.

Third OFF Mode ($t_5$~$t_6$)

Figure 15:
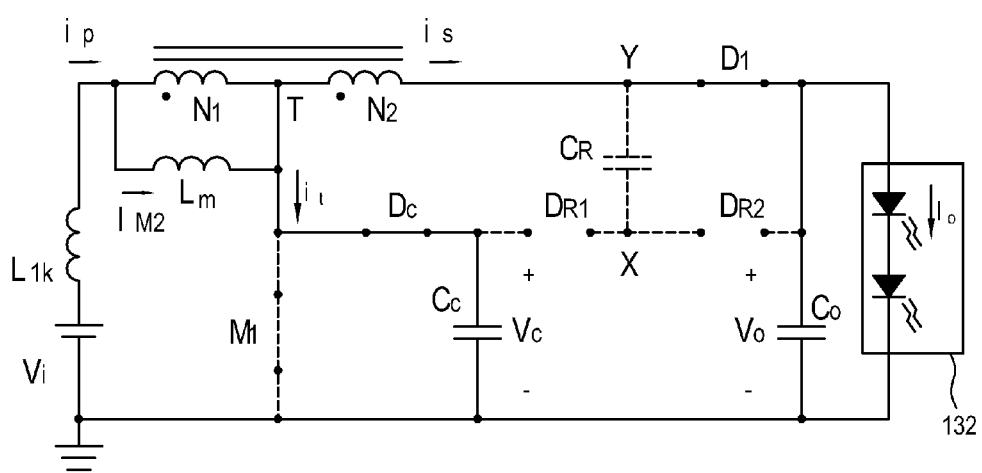

After $C_R$ is completely discharged and the snubber 141 stops operating, $D_1$ is turned on but $D_{R2}$ is turned off, thereby starting this mode. Because of $C_e \gg C_d$, its equivalent circuit is formed as shown in FIG. 15. After a half cycle of resonance, ic=0 at a time $t_6$, thereby terminating this mode.

The following operations are the same as those of the existing tapped-inductor boost converter having no snubber.

Below, a driving method of the light source driving apparatus 140 according to an exemplary embodiment will be described with reference to accompanying drawing.

Figure 16:
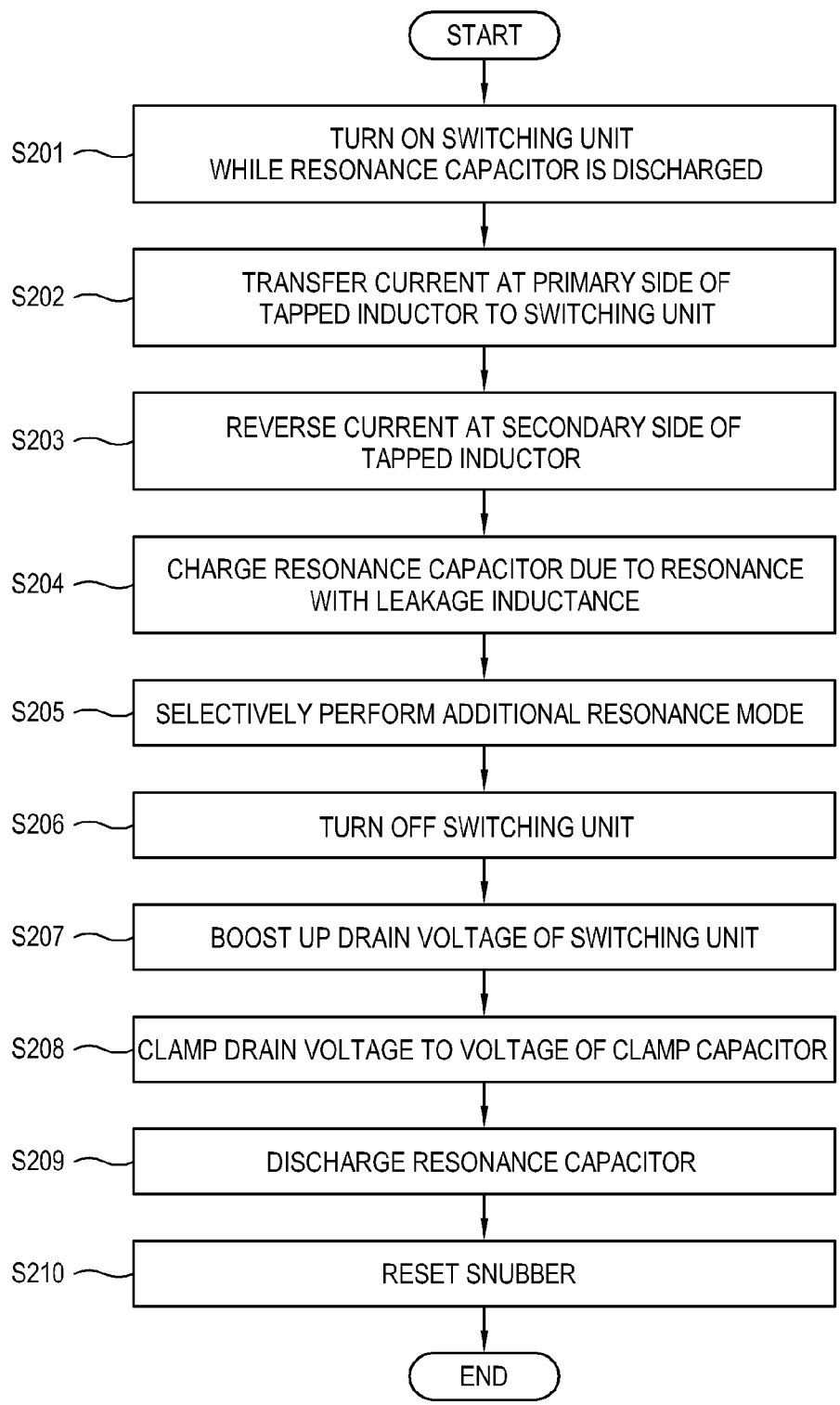
FIG. 16 is a flowchart showing a driving method of a light source driving apparatus according to an exemplary embodiment.

FIG. 16 is a flowchart showing a driving method of a light source driving apparatus 140 that operates in the current continuity mode based on the switching cycle of the switching unit, according to an exemplary embodiment.

As shown in FIG. 16, the TIBC circuit of light source driving apparatus 140 turns on the switching unit $M_1$ in the state that the resonance capacitor $C_R$ is completely discharged (S201).

If $M_1$ is turned on in the operation S201, the primary current $i_p$ of the tapped inductors $N_1$ and $N_2$ is transferred to $M_1$, and the secondary current $i_s$ of $N_1$ and $N_2$ becomes 0 (S202). Here, the operations S201 and S202 correspond to the first ON mode.

$i_s$ that becomes 0 in the operation S202 is reversed so that the first the resonance diode $D_{R1}$ is turned on (S203).

Further, the resonance capacitor $C_R$ is charged by resonance with the leakage inductance $L_{1k}$ of $M_1$ (S204). Here, the operations S203 and S204 correspond to the second ON mode.

After the resonance capacitor $C_R$ is fully charged, the TIBC circuit in this exemplary embodiment may selectively perform the additional resonance mode in accordance with a predetermined voltage condition (S205). The additional resonance mode corresponds to the third ON mode and the fourth ON mode.

The switching unit $M_1$ is then turned off in accordance with preset cycles (S206).

As $M_1$ is turned off in the operation S206, the drain voltage $V_{ds}$ of $M_1$ is boosted up (S207). The operations S205 and S206 correspond to the first OFF mode.

$V_{ds}$ boosted up in the operation S207 does not increase any more as the clamp diode $D_c$ is turned on, and is then clamped into the voltage $V_c$ of the clamp capacitor (S208). The operations S207 and S208 correspond to the second OFF mode, in which voltage stress is prevented from increasing because $V_{ds}$ is clamped into $V_c$.

Further, the resonance capacitor $C_R$ is discharged (S209).

In response to the discharge in operation S209 being completed, the snubber 141 is reset (S210). The operations S209 and S210 correspond to the third OFF mode. Thus, the first cycle of the switching unit $M_1$ is terminated, and the following operations S201 to S210 are repeated, thereby continuously performing the second and third cycles.

Meanwhile, in the foregoing exemplary embodiments, the TIBC circuit is provided as a driving circuit for driving the light source (e.g., the backlight) of an LED TV and like display apparatuses, and the snubber is provided in the TIBC circuit, but is not limited thereto. For example, the foregoing exemplary embodiments may be applied to an LED illumination driver including the TIBC circuit.

Thus, in the TIBC circuit including the lossless snubber 141, according to an exemplary embodiment, the voltage for turning off the MOSFET $M_1$ is clamped by Cc into $(N_1V_o+N_2V_i)/(N_1+N_2)$, and $C_R$ is charged/discharged and performs resonance, thereby regenerating energy. Here, the snubber 141 may be achieved by a simple circuit that includes one clamp capacitor Cc having a capacity large enough to maintain a certain voltage within the switching cycle; one resonance capacitor $C_R$ having a capacity significantly small enough to fully charged and discharged within the switching cycle; and $D_C$, $D_{R1}$ and $D_{R2}$ having a capacity tiny enough to be turned on for a short time, and does not additionally need an auxiliary inductor. Also, the voltage for turning off the MOSFET is clamped into $(N_1V_O+N_2V_i)/(N_1+N_2)$, and it is thus possible to use a MOSFET having a low withstand voltage.

Therefore, the TIBC circuit provided with the lossless snubber 141 according to an exemplary embodiment can prevent voltage stress from increasing during the resonance since the voltage $V_{ds}$ of the switching unit $M_1$ is clamped by $C_c$ to $(N_1V_o+N_2V_i)/(N_1+N_2)$.

Also, the snubber 141 according to an exemplary embodiment is a lossless snubber that includes only the capacitor and diode. Therefore, the other elements except the large capacity capacitor can be achieved with small capacities, thereby minimizing the costs of materials needed for the snubber.

Accordingly, the snubber can be usefully applied to the cases requiring a high boosting ratio. In particular, the operation of the snubber is simplified under the condition of $D>0.5*(1+N_1/N_2)$, thereby having an effect on maximally preserving the fundamental features of the original TIBC.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. A light source driving apparatus with a tapped-inductor boost converter (TIBC) circuit,
the TIBC circuit comprising:
a switching unit configured to be turned on and off in accordance with a driving signal;
a tapped inductor configured to transfer a current from a primary side to a secondary side as the switching unit is turned on and off, the tapped inductor comprising a first inductor and a second inductor coupled to the first inductor;
a snubber provided at the secondary side of the tapped inductor, the snubber comprising a clamp capacitor and a clamp diode configured to clamp a voltage of the switching unit, a first resonance diode and a second resonance diode connected in series to each other, and a resonance capacitor connected to the secondary side of the tapped inductor at one end thereof and connected to a point between the first and second resonance diodes at the other end thereof, the resonance capacitor being configured to perform a resonance as being charged and discharged corresponding to a switching cycle of the switching unit;
an output-side diode connected to the secondary side of the tapped inductor at one end thereof and connected to the second resonance diode at the other end thereof; and
an output-side capacitor connected to the output-side diode and the second resonance diode,
wherein the clamp capacitor is configured to have a larger capacity than the resonance capacitor.

2. The light source driving apparatus according to claim 1, wherein the clamp capacitor comprises a capacitor configured to maintain a predetermined voltage within the switching cycle.

3. The light source driving apparatus according to claim 1, wherein the resonance capacitor comprises a capacitor configured to be fully charged and discharged within the switching cycle.

4. The light source driving apparatus according to claim 3, wherein the clamp capacitor and the resonance capacitor are configured to have larger capacity than a drain-source capacitor of the switching unit.

5. The light source driving apparatus according to claim 1, wherein the voltage of the switching unit is configured to be clamped by a voltage of the clamp capacitor.

6. The light source driving apparatus according to claim 5, wherein the voltage of the clamp capacitor is configured to have a level obtained from dividing an output voltage and input voltage of the tapped-inductor boost converter circuit by a turn ratio of the tapped inductor.

7. The light source driving apparatus according to claim 1, wherein the snubber is configured to operate in a current continuity mode which corresponds to the switching cycle of the switching unit.

8. The light source driving apparatus according to claim 1, wherein the switching unit is configured to be turned on in a state that the resonance capacitor is discharged.

9. The light source driving apparatus according to claim 8, wherein the tapped-inductor boost converter circuit is configured to reverse a current in the secondary side of the tapped inductor in response to the switching unit being turned on, and perform a resonance with leakage inductance of the switching unit to charge the resonance capacitor.

10. The light source driving apparatus according to claim 9, wherein the tapped-inductor boost converter circuit is configured to selectively perform an additional resonance in accordance with preset voltage conditions.

11. The light source driving apparatus according to claim 9, wherein the tapped-inductor boost converter circuit is configured to clamp a drain voltage of the switching unit, which is boosted up to a voltage of the clamp capacitor as the switching unit is turned off, and discharges the resonance capacitor.

12. A display apparatus comprising:
a display which displays an image; and
a driver which drives the display and comprises a tapped-inductor boost converter (TIBC) circuit,
the TIBC circuit comprising:
a switching unit which is turned on and off in accordance with a driving signal;
a tapped inductor which transfers a current from a primary side to a secondary side as the switching unit is turned on and off, the tapped inductor comprising a first inductor and a second inductor coupled to the first inductor;
a snubber provided at the secondary side of the tapped inductor, the snubber comprising a clamp capacitor and a clamp diode configured to clamp a voltage of the switching unit, a first resonance diode and a second resonance diode connected in series to each other, and a resonance capacitor connected to the secondary side of the tapped inductor at one end thereof and connected to a point between the first and second resonance diodes at the other end thereof, the resonance capacitor being configured to perform a resonance as being charged and discharged corresponding to a switching cycle of the switching unit;
an output-side diode connected to the secondary side of the tapped inductor at one end thereof and connected to the second resonance diode at the other end thereof; and an output-side capacitor connected to the output-side diode and the second resonance diode, wherein the clamp capacitor is configured to have a larger capacity than the resonance capacitor.

13. The display apparatus according to claim 12, wherein the clamp capacitor comprises a capacitor configured to maintain a predetermined voltage within the switching cycle, and the resonance capacitor comprises a capacitor configured to be fully charged and discharged within the switching cycle.

14. The display apparatus according to claim 12, wherein the voltage of the switching unit is configured to be clamped by a voltage of the clamp capacitor.

15. The display apparatus according to claim 14, wherein the voltage of the clamp capacitor is configured to have a level obtained from dividing an output voltage and input voltage of the tapped-inductor boost converter circuit by a turn ratio of the tapped inductor.

16. The display apparatus according to claim 12, wherein the switching unit is turned on in a state that the resonance capacitor is discharged, and the tapped-inductor boost converter circuit is configured to reverse a current in the secondary side of the tapped inductor in response to the switching unit being turned on, and performs a resonance with leakage inductance of the switching unit to charge the resonance capacitor.

17. The display apparatus according to claim 16, wherein the tapped-inductor boost converter circuit is configured to clamp a drain voltage of the switching unit, which is boosted up to a voltage of the clamp capacitor as the switching unit is turned off, and discharges the resonance capacitor.

18. A driving method of a light source driving apparatus with a tapped-inductor boost converter circuit comprising a switching unit turned on and off in accordance with a preset cycle, a tapped inductor transferring a current from a primary side to a secondary side as the switching unit is turned on and comprising a first inductor and a second inductor coupled to the first inductor, and a snubber provided at the secondary side of the tapped inductor and operating in a current continuity mode, the method comprising:

turning on the switching unit in a state where a resonance capacitor of the snubber is discharged, the resonance capacitor being connected in parallel with the second inductor;

transferring a current from the primary side of the tapped inductor to the switching unit as the switching unit is turned on;

reversing a current in the secondary side of the tapped inductor;

by a first resonance diode and a second resonance diode of the snubber, performing a resonance between leakage inductance of the switching unit and the resonance capacitor in order to charge the resonance capacitor; and clamping the drain voltage of the switching unit to a voltage of a clamp capacitor, wherein the resonance capacitor at one end thereof is connected to the secondary side of the tapped inductor and at the other end thereof, connected to a point between the first and second resonance diodes, wherein the tapped-inductor boost converter circuit further comprises an output-side diode connected to the secondary side of the tapped inductor at one end thereof and connected to the second resonance diode at the other end thereof, and an output-side capacitor connected to the output-side diode and the second resonance diode, and wherein the clamp capacitor is configured to have a larger capacity than the resonance capacitor.

19. The method according to claim 18, further comprising: performing an additional resonance by the tapped-inductor boost converter circuit in accordance with preset voltage conditions.

20. The method according to claim 18, further comprising:

turning off the switching unit; and boosting up a drain voltage of the switching unit as the switching unit is turned off.

21. The method according to claim 20, further comprising:

discharging the resonance capacitor.

22. The method according to claim 21, wherein the voltage of the clamp capacitor has a level obtained from dividing an output voltage and input voltage of the tapped-inductor boost converter circuit by a turn ratio of the tapped inductor.

23. The method according to claim 18, wherein the clamp capacitor comprises a capacitor to maintain a predetermined voltage within the switching cycle, and the resonance capacitor comprises a capacitor to be fully charged and discharged within the switching cycle.

24. A tapped-inductor boost converter (TIBC) circuit comprising:

a switching unit configured to be turned on and off in accordance with a driving signal;

a tapped inductor configured to transfer a current from a primary side to a secondary side as the switching unit is turned on and off, the tapped inductor comprising a first inductor and a second inductor coupled to the first inductor;

a snubber provided at the secondary side of the tapped inductor, the snubber comprising a clamp capacitor configured to clamp a voltage of the switching unit, a first and a second resonance diode connected to each other, and a resonance capacitor connected to the secondary side of the tapped inductor at one end thereof and connected to a point between the first and second resonance diodes at the other end thereof, the resonance capacitor configured to perform a resonance as being charged and discharged corresponding to a switching cycle of the switching unit; and an output-side diode connected to the secondary side of the tapped inductor at one end thereof and connected to the second resonance diode at the other end thereof, wherein the clamp capacitor is configured to have a larger capacity than the resonance capacitor.

25. The TIBC circuit of claim 24, wherein the snubber further comprises a clamp diode.

* * * * *